UNITED STATES PATENT OFFICE.

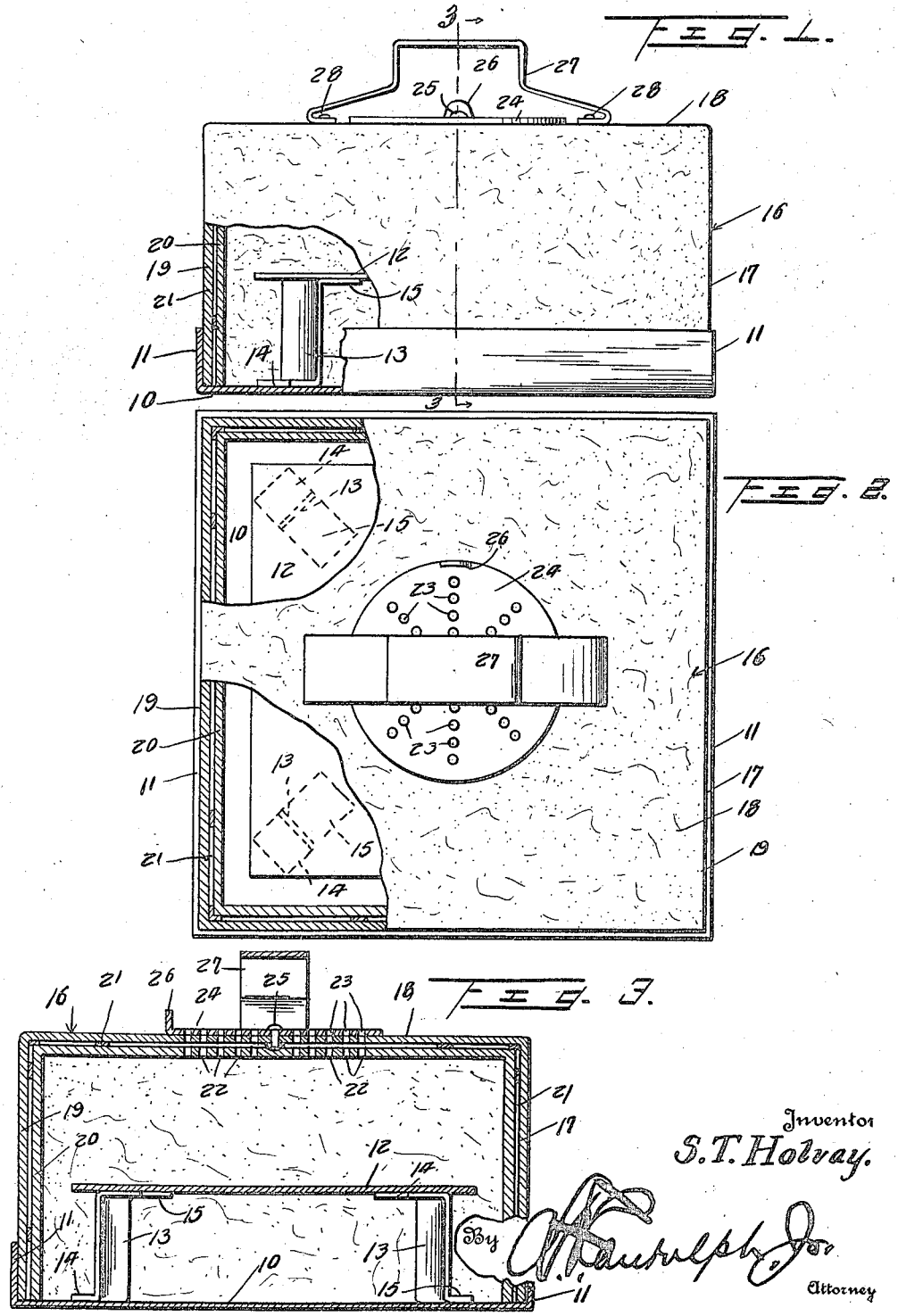

SUSIE T. HOLVAY, OF WATTS, CALIFORNIA.

OVEN.

Application filed August 31, 1922. Serial No. 585,359.

*To all whom it may concern:*

Be it known that I, SUSIE T. HOLVAY, a citizen of the United States, residing at Watts, in the county of Los Angeles and State of California, have invented certain new and useful Improvements in an Oven; and I do hereby declare the following to be a full, clear, and exact description of the invention, such as will enable others skilled in the art to which it appertains to make and use the same.

This invention relates to an oven.

It is primarily aimed to provide an oven which may be heated from a single burner of a gas or other stove to enable baking merely from the heat provided by such single burner and in relatively close quarters, and in cases where the stove has an oven, to provide the invention as smaller in size than the same and heat-insulated so that it may be used instead of such oven, particularly in the summer, as less heat will be radiated thereby.

It is further aimed to provide a construction having a novel hood or cover section suitably heat-insulated, provided with a damper, adapted to be disposed on a base having a supporting rack or shelf, and with the supporting means for the rack or shelf disposed so as to enable said rack and the material supported thereon to be evenly heated.

Servient objects and advantages will become apparent from a consideration of the description following taken in connection with accompanying drawings illustrating one practical embodiment.

In said drawings:—

Figure 1 is a side elevation, partly broken away;

Figure 2 is a plan view partly broken away, and

Figure 3 is a cross sectional view on the line 3—3 of Figure 1.

In reducing the invention to practice, a base section is provided as at 10 which has a continuous marginal upstanding flange 11 integral therewith. This base may be made of any suitable material, preferably metal, and therefrom a rack or shelf 12 is supported in raised relation, and in turn adapted to support a pan or other receptacle containing food or goods to be baked or heated within the oven. Upstanding cleats 13 may be utilized to support the rack 12 from the base and they preferably have angularly bent ends at 14 and 15, respectively engaging and secured to the base and the shelf 12. Said cleats 13 are equidistantly spaced from each other and from the center of the base, so that the heat will be evenly radiated within the oven, particularly in view of the fact that the base 10 is adapted to be centrally disposed on the burner or a single burner of a gas heat stove or other stove, in actual use. Said cleats 13 and the shelf 12 may be made of sheet metal similarly to the base 10.

A cover or hood section is provided for removable disposition on the base 10, and is generally designated 16. This hood may be of any suitable construction. As shown it has a continuous side wall 17 and a top wall 18, and is open at its bottom or base. Said walls 17 and 18 consist of an inner and outer layer 19 and 20, preferably of asbestos or other heat insulating material. The layers 19 and 20 are held in the shape shown by an intermediate skeleton metallic frame 21.

Suitable vent openings are provided through the layers 19 and 20 at the top wall 18, as at 22 and they are adapted to register with vent openings or ports 23 in a damper plate 24. Damper plate 24 is adapted for axial adjustment from a rivet or other pivot means at 25 which secures the same to the wall 18 and through which adjustment the openings 22 may be partially or completely closed. A manipulating lug 26 rises from the damper 24.

To facilitate handling or portage of the cover or dome 16, a handle 27 of any appropriate configuration is secured to the hood as at 28.

In use the base 10 is disposed over a burner of a gas or other stove, centrally, so as to be heated therefrom and a pan or receptacle containing the food or goods to be baked or heated is disposed on the rack or shelf 12. The hood 16, applied by means of its handle 27, is disposed on the base 10, removably, with the flange 11 surrounding the wall 17. The damper 24 may be suitably adjusted to cooperate with the vent openings 22 according to the degree of heat in the oven and as derived from the burner referred to. By means of this invention, a single burner of a gas or other stove may be utilized for baking purposes and in hot weather, an oven, smaller than the oven of a stove having one, may be supported on one of its burners and used for baking purposes, with the radiation of less heat than would be the case with its own oven.

As merely one practical embodiment has been illustrated and described, it is to be understood that changes in the details may be resorted to provided they fall within the spirit and scope of the invention.

I claim as my invention:—

1. An oven having a base for application of heat thereto, a cover for disposition thereon, said cover having layers of heat insulating material to substantially compose it, and a reinforcing frame between said layers of substantially skeleton form.

2. An oven having a base, a cover for disposition thereon, said cover having layers of heat insulating material to substantially compose it, a reinforcing frame between said layers, said frame being of skeleton form, a damper, means pivoting said damper passing through said frame, and coacting vent openings in said damper and layers.

3. An oven having a base for application of heat thereto, a cover for removable disposition on said base, a flange on said base to surround said cover at its lower end, said base having a rack, cleats supporting said rack from said base equidistantly spaced from the center of the base, said base having an inner and an outer layer of asbestos, a skeleton reinforcing frame intermediate said layers, said layers having vent openings therethrough, a damper having openings to coact with said openings, a pivot member for said damper passing through one of said layers and said skeleton frame, and a handle for the cover secured thereto and disposed over said damper.

In testimony whereof I affix my signature in presence of two witnesses.

Mrs. SUSIE T. HOLVAY.

Witnesses:
HOWARD E. HAHN,
LEONARD B. HUFFORD.